UNITED STATES PATENT OFFICE.

SAMUEL W. RAMSEY, OF KENT, OHIO.

PROCESS FOR PRODUCING CEMENTITIOUS PRODUCTS.

1,036,712.   Specification of Letters Patent.   Patented Aug. 27, 1912.

No Drawing.   Application filed February 18, 1911. Serial No. 609,385.

*To all whom it may concern:*

Be it known that I, SAMUEL W. RAMSEY, a citizen of the United States of America, residing at Kent, in the county of Portage and State of Ohio, have invented certain new and useful Improvements in Processes for Producing Cementitious Products; and I hereby declare the following to be a full, clear, and exact description of the invention, such as will enable others skilled in the art to which it pertains to make and use the same.

This invention relates to a new process for producing cementitious products.

The object of my invention is to provide a new process for producing a cementitious product such as brick, tile, artificial stone, sewer-pipe and the like, which can be cheaply operated and which will produce a product that will be impervious to the action of water, able to stand climatic changes and capable of resisting severe crushing strain.

My invention, therefore, consists of the process described in the specification and particularly set forth in the claims.

In carrying out my invention I employ the ingredients, and in the proportions by volume, as follows:

| | |
|---|---|
| Blast furnace slag | 90 parts |
| Silica sand | 1 " |
| Lime | 5 " |
| Bicarbonate of soda | 2 " |
| Oxid of iron | 1 " |
| Chrome alum | 1 " |
| | 100 |

The blast furnace slag is first ground to a suitable fineness and the bicarbonate of soda, the lime, the oxid of iron, the alum and the silica sand are then added to the ground slag and all the ingredients are thoroughly mixed and commingled by agitation and the composition is then placed in a suitable mold or molds, according as the product which is to be formed is brick, tile or pipe. After the composition has been given the desired form or configuration the composition is removed from the mold and placed in a closed chamber or receptacle to which steam is admitted and maintained therein at a pressure of about one hundred and fifty pounds to the square inch. The composition is subjected to the action of the steam at this pressure for about five hours during which time the steam will thoroughly penetrate the composition and come in contact with the lime, oxid of iron and alum and produce chemical reactions which eliminate the sulfur that is in the slag or convert it into a salt which is not injurious to the composition. The product is then removed from the steam chamber and allowed to cool.

Brick, tile, artificial stone, sewer pipe and the like formed according to my process will be very compact and will withstand a crushing strain of from six to eight thousand pounds to the square inch. The product formed will not disintegrate under the action of the weather and is unaffected by climatic changes.

What I claim is,—

1. The herein described process of producing a cementitious product consisting in mixing together a predetermined quantity of ground blast furnace slag, bicarbonate of soda, lime, oxid of iron and chrome alum, agitating the mixture until all the ingredients are thoroughly commingled, then placing the composition in a closed chamber under steam pressure until the steam has penetrated the composition.

2. The herein described process of producing a cementitious product consisting in mixing together a predetermined quantity of ground blast furnace slag, bicarbonate of soda, lime, oxid of iron, chrome alum and silica sand, agitating the mixture until all the ingredients are thoroughly commingled, then placing the composition in a closed chamber under steam pressure until the steam has penetrated the composition.

3. The herein described process of producing a cementitious product consisting in mixing together a predetermined quantity of ground blast furnace slag, bicarbonate of soda, lime, oxid of iron and chrome alum, agitating the mixture until all the ingredients are thoroughly commingled, then placing the composition in a closed chamber and subjecting the same to a steam pressure of one hundred and fifty pounds to the square inch for five hours.

4. The herein described process of producing a cementitious product consisting in mixing together a predetermined quantity of ground blast furnace slag, bicarbonate of soda, lime, oxid of iron, chrome alum and silica sand, agitating the mixture until all the ingredients are thoroughly commingled, then placing the composition in a closed chamber and subjecting the same to a steam pressure of one hundred and fifty pounds to the square inch for five hours.

5. The herein described process of producing a cementitious product consisting in mixing together ninety parts of ground blast furnace slag, two parts bicarboate of soda, five parts lime, one part oxid of iron, one part chrome alum and one part silica sand, then agitating the mixture until all the ingredients are thoroughly commingled and then placing the composition in a closed chamber under steam pressure until the steam has penetrated the composition.

6. The herein described process of producing a cementitious product consisting in mixing together ninety parts of ground blast furnace slag, two parts bicarbonate of soda, five parts lime, one part oxid of iron, one part chrome alum and one part silica sand, then agitating the mixture until all the ingredients are thoroughly commingled and then placing the composition in a closed chamber and subjecting the same to a steam pressure of one hundred and fifty pounds to the square inch for five hours.

In testimony whereof, I sign the foregoing specification, in the presence of two witnesses.

SAMUEL W. RAMSEY.

Witnesses:
 W. B. SMITH,
 H. C. FRESHWATER.